Patented June 19, 1951

2,557,903

UNITED STATES PATENT OFFICE 2,557,903

DIOLEFIN-ACONITATE COPOLYMERS AND METHOD OF MAKING SAME

Raymond F. Boyer and Louis C. Rubens, Midland, Mich., assignors to The Dow Chemical Company, Midland, Mich., a corporation of Delaware No Drawing. Application March 3, 1947, Serial No. 732,146

20 Claims. (Cl. 260—78.5)

This invention concerns certain new polymeric materials comprising reaction products of aliphatic conjugated diolefinic hydrocarbons and triesters of aconitic acid. It also concerns a method of making the polymeric materials.

It is known to copolymerize aliphatic conjugated diolefines with esters of unsaturated carboxylic acids, and a number of copolymers, such as those of butadiene with vinyl chloride, vinyl acetate, vinyl cyanide, ethyl acrylate, methyl methacrylate, and diethyl maleate, respectively, have heretofore been prepared. In most, if not all, instances, such known polymeric materials are products of a simple and direct copolymerization reaction between a diolefine and an unsaturated ester, and wide variations as to the relative proportions of diolefine and unsaturated ester entering into the copolymerization reaction are possible. Also, in most instances such copolymers are highly unsaturated materials which are either discolored when formed, or rapidly undergo discoloration under exposure to light and air unless protected by incorporation of a stabilizing agent, e. g. an antioxidant, therewith. The unsaturated esters employed in making the known copolymers are usually compounds which readily become polymerized when heated alone, e. g. at 100° C.

We have found that esters of aconitic acid react readily with aliphatic conjugated diolefines, particularly with diolefines having from 4 to 6 carbon atoms in the molecule, to form polymeric materials, but that the reaction appears to occur differently from most copolymerization reactions and that the polymeric products have certain useful properties not possessed by most of the previously known copolymers of diolefines and other unsaturated esters.

The esters of aconitic acid, although unsaturated, do not readily or rapidly undergo polymerization when heated, e. g. at 100° C. They may readily be purified by fractional distillation without appreciable loss of material due to polymerization and they are not compounds of the types which would be considered "readily polymerizable." It is known, of course, that aliphatic conjugated diolefines such as butadiene or isoprene do not readily or rapidly become polymerized when heated alone at 100° C. and that special conditions and catalysts are required in order to polymerize them rapidly and completely. We have found that a diolefine and an ester of aconitic acid, each of which is difficultly polymerizable when alone, react together readily and fairly rapidly at temperatures in the order of from room temperature to 80° C. to form a polymeric material of fairly high molecular weight, e. g. above 5000. The reaction may be catalyzed by usual polymerization catalysts such as hydrogen peroxide, diacetyl peroxide, dilauroyl peroxide, dibenzoyl peroxide, or other peroxygen compounds, but the presence of a catalyst is not required. We have further found that, although the physical properties of the polymeric product may be modified by changes in the relative proportions of diolefine and aconitic acid ester in the mixture from which the polymer is formed, the polymeric material is composed of approximately equimolecular amounts of the diolefine and ester in chemically combined form. Any excess of either reactant remains for the most part unreacted at the time when formation of said polymeric material is complete. It appears probable that the diolefine and the aconitate react together in equimolecular proportions to form a readily polymerizable intermediate compound and that the intermediate compound polymerizes, as it is formed, to produce the polymeric product. However, the invention is not restricted to this, or any other, theory as to the reason for the results obtained. Attempts, on our part, to prevent polymerization of the intermediate compound which is believed to be formed and to isolate and identify said compound have not been successful, presumably because the intermediate compound is very readily polymerizable even in the presence of a usual polymerization inhibitor, such as tertiary butyl catechol, and undergoes polymerization at a rate as great as its rate of formation.

We have further found that the solid polymers formed in accordance with the invention are clear, colorless transparent products which are exceptionally stable against discoloration by the action of light and air. Peculiarly, in instances in which incompletely purified aconitic acid esters of dark color, e. g. of brownish-black color, have been used in making the solid polymers, the discoloration disappeared during early stages of the polymerization reaction and the polymeric products were colorless. The liquid polymers provided by the invention usually are nearly colorless, e. g. of light yellow or straw color. It is believed that the color is due to traces of impurities and that the liquid products themselves are colorless.

We have also found that the polymeric products formed from a diolefine and a trialkyl or triaryl aconitate are not unsaturated in the sense of containing unsaturated radicals of activity as great as that of an ordinary olefinic linkage, e. g. in ethylene. When the polymers are dissolved in an inert solvent and treated with bromine they slowly absorb the bromine, indicating that carbon to carbon double bonds are present, but the rate of reaction is slower than usual for the reaction of bromine with olefinic linkages in organic compounds. The polymers are capable of being vulcanized, but are not nearly as readily vulcanizable as is rubber. Accordingly, the polymers behave in many respects as though they are saturated, or nearly so, even though a polymer formed from a diolefine and an unsaturated ester would be expected to contain olefine linkages. It is evident that the carbon to carbon double bonds which are present in the polymer molecule are far less reactive than usual olefinic linkages.

The polymeric materials provided by the invention are colorless, or lightly colored, transparent materials which vary from viscous liquids to rubber-like solids to hard brittle resins, depending on the particular reactants and reaction conditions used in preparing them. For instance, the reaction of butadiene with trimethyl aconitate at temperatures in the order of from room temperature to about 80° C. results in formation of a polymer which often is quite rubbery when first obtained, but which, after being freed of unreacted materials, is a hard, brittle, colorless, transparent resin. The reaction between butadiene and tributyl aconitate at similar temperatures results in a solid rubbery polymer of low tensile strength, but of good elasticity. The unvulcanized polymer tends to flow during tests to determine its per cent elongation and tensile strength properties and accurate determinations of these properties has not been possible. However, the polymer has been vulcanized and the tensile strength and per cent elongation values of the vulcanized material have been measured. In general, an increase, e. g. from 1 to 10, in the number of carbon atoms in the alcohol radicals of trialkyl aconitates used in forming the polymers results in a decrease, or elimination, of brittleness and in production of polymers which, when prepared at the above-mentioned temperatures, are resinous or rubber-like. However, such increase in the number of carbon atoms in the alcohol radicals of the trialkyl aconitates is accompanied by a decrease, under otherwise similar reaction conditions, in rate of reaction to form the polymer. Under similar reaction conditions, a tricycloalkyl aconitate reacts with a diolefine more rapidly that a trialkyl aconitate having the same number of carbon atoms in the molecule and a solid polymer formed from the tricycloalkyl aconitate is harder and stiffer than that formed from the trialkyl aconitate. For instance, at temperatures of from room temperature to 80° C. tricyclohexyl aconitate reacts with butadiene to form a clear, colorless, transparent resin which is quite hard and brittle, whereas tri-n-hexyl aconitate and butadiene react under similar conditions to form a soft, rubbery polymer which is clear, colorless and transparent.

Although a diolefine and a triester of aconitic acid always react in approximately, e. g. within 10 per cent of, equimolecular proportions to form a polymer of the kind provided by the invention, the properties of the polymeric product vary somewhat with changes in the relative proportions of the two reactants in the mixture subjected to the reaction. In general, the employment of an excess of the diolefine reactant results in formation of a polymer which is stiffer and less rapidly swelled or dissolved by a solvent than when the reactants are used in equimolecular proportions. These effects become more pronounced with increase in the excess of diolefine. Such increase in stiffness and decrease in rate of dissolving of the polymer are believed to be due to occurrence of a small amount of cross-linking, presumably by some of the excess diolefine, between molecules of the polymer that is formed when using the reactants in equimolecular proportions. Conversely, employment of an excess of aconitate ester in the starting mixture results in a polymer which, as obtained, is more flexible and more rapidly dissolved than the polymer obtained from a mixture of the reactants in equimolecular proportions. This apparently is because of retention of unreacted aconitic acid triester in the polymeric product. For instance, the polymeric material obtained at reaction temperatures below 80° C. from a mixture of butadiene and excess trimethyl aconitate often is soft and rubbery, but upon being dissolved in and precipitated from a solvent the polymer is obtained as a hard brittle resin. The latter possesses excellent film-forming properties when cast from a solution thereof.

As the reaction temperature for formation of the polymers is raised above 80° C., there apparently is a pronounced decrease in the molecular weight of the polymer formed, and at reaction temperatures of 100° C. and higher the polymers which are formed usually are liquid, or soft tacky rubbery materials, when cooled to room temperature. The invention is particularly concerned with the polymers formed at reaction temperatures below 80° C., but it also pertains to those formed at higher temperatures, e. g. from 80° to 200° C.

The solid polymers formed in accordance with the invention are swellable by and, in most instances, soluble in usual organic solvents such as acetone, carbon tetrachloride, or benzene, etc. However, they are insoluble, or only sparingly soluble in methyl and ethyl alcohols. When necessary, they may be purified by dissolving the same in an organic solvent such as acetone and adding alcohol to precipitate the polymer. Liquid polymers, prepared in accordance with the invention, may be dissolved in solvents for the solid polymers. The polymeric products, when applied in liquid or tacky form, or as solutions thereof, to glass, form a tightly adhering film on the latter. Accordingly, they are useful in bonding together glass surfaces. The solid rubbery polymers, in particular, may be used in the manufacture of safety glass. Because of their clarity, transparency, lack of color, and their stability against discoloration under the action of light and air, the polymers are well adapted to such purposes. The liquid to tacky solid polymers formed at reaction temperatures above 80° C. are useful as plastifying agents for thermoplastic resins.

Although any aliphatic conjugated diolefine may be employed in practice of the invention, diolefines having from 4 to 6 carbon atoms in the molecule, e. g. isoprene, or 2,3-dimethyl-butadiene-1,3, and particularly butadiene-1,3, are usually employed. Examples of triesters of aconitic acid which may be used in making the polymers are trimethyl aconitate, triethyl aconitate, tripropyl aconitate, tri-isopropyl aconitate, tributyl aconitate, tri-sec.-butyl aconitate, tri-tert.-butyl aconitate, triamyl aconitate, tri-isoamyl aconitate, trihexyl aconitate, trioctyl aconitate, trinonyl aconitate, tridecyl aconitate, tricyclohexyl aconitate, tri-methylcyclohexyl aconitate, and tri-(2-chloropropyl) aconitate, etc. Trialkyl aconitates containing at least 9, and especially from 10 to 24, carbon atoms in the molecule constitute a preferred group of ester reactants.

The reaction between a diolefine and a triester of aconitic acid to form a polymer is carried out in a closed reaction system so as to prevent free access of air to the mixture, since air, if accessible in unlimited amount, sometimes interferes with the reaction. However, it is not necessary that air be swept from a container partially filled with the reactants prior to carrying out the reaction since such limited access of air usually has little if any effect on the reaction. In most instances, the reaction is carried out en-masse at temperatures between room temperature and 80° C., but it may be carried out at lower or higher temperatures such as from 10° to 200° C. and in accordance with other usual polymerization procedures, e. g. with the reactants dissolved in a solvent such as benzene, xylene, or ligroin, or with the reactants suspended in, or emulsified with, water. The reaction may be accomplished in the presence or absence of a polymerization catalyst, but usually a minor amount, e. g. from 0.1 to 2 per cent by weight of a peroxide such as hydrogen peroxide, diacetyl peroxide, dilauroyl peroxide or dibenzoyl peroxide, etc., is added as a catalyst for the reaction. The diolefine and aconitate ester reactants are preferably employed in approximately equimolecular proportions, but either reactant may be used in as large an excess as desired. Crude hydrocarbon mixtures comprising a conjugated diolefine, e. g. cracked-oil gas or fractions thereof, may be treated directly with a triester of aconitic acid to obtain a polymer of good quality. In instances in which the polymer is obtained in a form containing an excess of either reactant, or containing hydrocarbon impurities, the impurities may be removed either by vaporization from the polymer, or, in instances in which the impurities are of low volatility, by dissolving the product in a volatile solvent, precipitating the polymer by adding the solution thereof to methyl or ethyl alcohol, separating the precipitate and vaporizing residual solvent therefrom.

The polymeric products may be modified by any of a variety of after treatments. For instance, they may be treated with a strong mineral acid, such as an aqueous solution of hydrochloric or sulphuric acid, so as to hydrolyze ester radicals thereof and produce an acid form of the polymer. In most instances an acidic polymer thus formed, is harder and more rigid than the ester polymer from which it is formed. Also, the ester polymers may be admixed with usual rubber compounding agents and be cured to obtain the same in vulcanized form. Other ways in which the ester polymers may be modified to obtain useful derivatives will be apparent.

The following examples describe certain ways in which the principle of the invention has been applied, but are not to be construed as limiting the invention.

EXAMPLE 1

A liquid mixture of 20 grams (0.371 mole) of butadiene, 5 grams (0.026 mole) of trimethyl aconitate, and 0.25 gram of benzoyl peroxide was warmed in a closed glass container at a temperature of 45° C. for 43 days and then at 50° C. for 10 days. At the end of the first 30 days of heating, it was observed that a solid polymer had formed. After the total 53 day period of heating, the container was opened and unreacted butadiene was permitted to vaporize therefrom. The residual polymeric product was a colorless transparent solid which was quite hard, but rubbery. When heated under vacuum to vaporize all unreacted starting materials from the same, it remains clear, colorless and transparent, but loses its rubbery property and becomes brittle. When immersed in a mixture of 70 per cent by volume carbon tetrachloride and 30 per cent dioxane, the polymer swells to ten times or more of its original volume.

EXAMPLE 2

A liquid mixture of 8 grams (0.148 mole) of butadiene, 20 grams (0.104 mole) of trimethyl aconitate and approximately 0.28 gram of benzoyl peroxide was heated at 45° C. in a glass container for 5 days at which time it was observed that a solid polymer had formed. However, heating was continued at 45° C. for a total of 43 days and thereafter at 50° C. for 10 days. The container was then opened and unreacted butadiene was vaporized therefrom. The product was a hard, clear, transparent resin. It dissolved when immersed in a solution of 70 per cent carbon tetrachloride and 30 per cent dioxane.

EXAMPLE 3

A liquid mixture of 20 grams (0.371 mole) of butadiene, 5 grams (0.0157 mole) of tributyl aconitate and approximately 0.25 gram of benzoyl peroxide was polymerized by procedure similar to that of Example 1. The polymeric product was a fairly hard, non-tacky, colorless, transparent solid possessing excellent elasticity, similar to that of rubber. However, it tended to flow when stretched. Accordingly, its per cent elongation value and tensile strength could not be measured with accuracy. The product swelled to at least 10 times its initial volume when immersed in a mixture of 70 per cent carbon tetrachloride and 30 per cent dioxane.

EXAMPLE 4

A liquid mixture of 5 grams (0.093 mole) of butadiene, 18 grams (0.0566 mole) of tributyl aconitate and approximately 0.23 gram of benzoyl peroxide was polymerized as in Example 3. It was observed that the polymerization occurred more rapidly than in Example 3, i. e. a solid polymer was visible in less than 15 days of heating at 45° C., whereas in Example 3, twenty days or more of heating was required before a solid polymer was visible. After 43 days of heating at 45° C. and 10 days at 50° C., the container was opened and unreacted materials were vaporized from the product. The latter was a fairly hard, but somewhat tacky, colorless, transparent solid having excellent elasticity, similar to that of rubber. It dissolved when immersed in a mixture of 70 per cent carbon tetrachloride and 30 per cent dioxane.

EXAMPLE 5

In each of three experiments, a mixture of butadiene, tributyl aconitate and about 1 per cent by weight of benzoyl peroxide was polymerized by heating the same in a closed container at about 45° C. The experiments differed from one another as regards the relative proportions of butadiene and tributyl aconitate in the starting mixtures. After completing each polymerization reaction, the product was removed from the container and freed of unreacted materials by dissolving the same in acetone, reprecipitating the polymer by adding methyl alcohol, separating the precipitate and vaporizing residual solvent therefrom. A portion of each polymer was analyzed for carbon and hydrogen and another portion was tested to determine the molecular weight of the product. The following table gives the molecular ratio of butadiene to tributyl aconitate in each mixture subjected to polymerization and the molecular weight of the polymeric product. It also gives the per cent by weight of carbon, hydrogen and oxygen in each product, the oxygen values being obtained by difference and not by direct analysis. In the table, butadiene is indicated by its empirical formula, $C_4H_6$, and tributyl aconitate is abbreviated as "T. B. A."

*Table*

| Run No. | Mole Ratio of $C_4H_6$/T. B. A. | Polymer | | | |
|---|---|---|---|---|---|
| | | Mole Weight | Analysis | | |
| | | | Per Cent C | Per Cent H | Per Cent O |
| 1 | 1/2 | 93,400 | 66.51 | 9.52 | 23.97 |
| 2 | 1/1 | 107,000 | 67.12 | 9.37 | 23.51 |
| 3 | 2/1 | 70,000 | 68.31 | 9.65 | 22.04 |

A polymer composed of equimolecular proportions of butadiene and tributyl aconitate should, theoretically, have the analysis: 66.7% C; 9.09% H and 24.2% O. It appears that the polymers are all composed of approximately equimolecular proportions of chemically combined butadiene and tributyl aconitate, but with the chemically combined butadiene in slight molecular excess over the aconitate content of the polymer.

EXAMPLE 6

A solution of 1 per cent by weight of benzoyl peroxide in a liquefied mixture of equimolecular amounts of butadiene and tributyl aconitate was added to an equal volume of an aqueous solution of Aquarex D (i. e. the mono-sodium sulphate esters of a mixture of higher alcohols, principally lauryl and myristic alcohols) of 4.5 per cent by weight concentration. The mixture was agitated to effect emulsification and the emulsion was warmed in a closed container, with continued agitation, at a temperature of 45° C. for 48 hours. The container was then opened and the reaction mixture was treated with sodium chloride in amount sufficient to coagulate the polymeric product. The latter was separated from the liquor, washed with water and dried. The product is a colorless rubbery solid which is slightly tacky at room temperature. The yield of polymer was 96.4 per cent of theoretical, based on the starting materials.

EXAMPLE 7

One hundred parts by weight of a slightly tacky polymer, prepared substantially as described in Example 6, was compounded on mixing rolls with 87.5 parts of carbon black, 10 parts of zinc oxide, 2 parts of sulphur and 0.5 part of Captax, i. e. mercaptobenzothiazole. The mixture was removed as a sheet from the rolls and a sample thereof was cured by heating the same at a temperature of 296° F. under a pressure of 2000 pounds per square inch for 20 minutes. The product was a non-tacky rubbery material having a tensile strength of 160 pounds per square inch, an elongation of 600 per cent of its original length when stretched to the breaking point, and a Rockwell hardness value of 34. Another sample of the compounded material was similarly cured, except at a curing temperature of 296° F. and a pressure of 5500 pounds per square inch. The cured, i. e. vulcanized, product was a non-tacky rubbery material having a tensile strength of more than 1000 pounds per square inch and a per cent elongation value of 600. Each of the vulcanized products just described undergoes swelling, but is not dissolved, when immersed in benzene or carbon tetrachloride. A paraffin-base mineral oil has little, if any, effect on the vulcanized products.

EXAMPLE 8

A liquid mixture of equimolecular amounts of butadiene and tri-isobutyl aconitate was polymerized to a clear, colorless, transparent rubbery solid on standing in a glass container at room temperature for 24 hours.

EXAMPLE 9

A liquefied mixture of approximately equimolecular amounts of isoprene and tributyl aconitate was treated with 1 per cent by weight of benzoyl peroxide and stored at room temperature in a closed glass container. After 40 days the mixture had reacted to form a soft, white, opaque, rubbery mass. The product is somewhat tacky at room temperature.

EXAMPLE 10

A liquefied mixture of equimolecular amounts of butadiene and tricyclohexyl aconitate was treated with 1 per cent by weight of benzoyl peroxide and stored at room temperature in a closed glass container. Within two days, the mixture had reacted to form a hard, colorless, transparent non-tacky resin.

EXAMPLE 11

In each of a series of experiments, a solution of 1 per cent by weight of benzoyl peroxide in a liquefied mixture of approximately equimolecular amounts of butadiene and the triester of aconitic acid named in the following table was stored at room temperature in a closed glass container. The container was periodically examined and the time when the reaction to form a solid polymer appeared to be complete was noted. Table II names the ester reactant employed in each experiment and states the polymerization time which was noted. It also states whether the polymer, after being freed of unreacted material, is rubbery or resinous.

*Table II*

| Run No. | Ester | Polym. Time | Polymer |
|---|---|---|---|
| | | Days | |
| 1 | Trimethyl Aconitate | 5 | Resinous. |
| 2 | Triethyl Aconitate | 8 | Rubbery. |
| 3 | Tripropyl Aconitate | 12 | Do. |
| 4 | Tributyl Aconitate | 15 | Do. |
| 5 | Tricyclohexyl Aconitate | 4 | Resinous. |

EXAMPLE 12

A rubbery polymer obtained from approximately equimolecular amounts of butadiene and tributyl aconitate, as in Example 5, was dissolved in carbon tetrachloride. Gaseous hydrogen chloride was bubbled into the solution for purpose of splitting ester radicals of the polymer and thereby converting the latter to its acid form. After a large excess of hydrogen chloride had been passed through the solution, the flow of hydrogen chloride was discontinued and the solution was evaporated to dryness. The residual polymer was a colorless, transparent resin. It possessed good film-forming properties when cast from a solution thereof. It was harder and far less rubber-like than the initial ester form of the polymer.

EXAMPLE 13

In each of three experiments, a mixture of triethyl aconitate and liquefied butadiene was heated in a sealed glass tube at a temperature of 100° C. for 20 hours. The experiments differed from one another with regard to the relative proportions of butadiene and triethyl aconitate employed, i. e. in the first experiment the molecular ratio of butadiene to triethyl aconitate was 2; in the second experiment said ratio was 1; and in the third experiment the ratio was 0.5. At the close of the heating period each tube was cooled, opened and unreacted starting material was distilled from the product as completely as possible. The residual product which in each instance was a viscous oil, was analyzed to determine the proportions of butadiene and triethyl aconitate chemically combined in forming the same. The products obtained in the first two experiments were similar in appearance and viscosity and each had carbon and hydrogen analysis corresponding closely to that of a product formed by combination of equimolecular amounts of butadiene and triethyl aconitate. The product of the third experiment is believed to be identical with that obtained in the first two experiments, but due to difficulty of removing unreacted triethyl aconitate therefrom by distillation under vacuum its composition was not definitely determined.

Other modes of applying the principle of the invention may be employed instead of those explained, change being made as regards the method and products herein disclosed, provided the steps or compounds stated by any of the following claims or the equivalent of such stated steps or compounds be employed.

We therefore particularly point out and distinctly claim as our invention:

1. A method of making a substantially colorless, transparent copolymer of approximately equimolecular amounts of an aliphatic conjugated diolefine and a saturated monohydric alcohol triester of aconitic acid which comprises reacting an aliphatic conjugated diolefine with a saturated monohydric alcohol triester of aconitic acid.

2. A method of making a substantially colorless, transparent solid copolymer of approximately equimolecular amounts of an aliphatic conjugated diolefine and a saturated monohydric alcohol triester of aconitic acid which comprises reacting an aliphatic conjugated diolefine having from 4 to 6 carbon atoms in the molecule with a saturated monohydric alcohol triester of aconitic acid at a reaction temperature below 80° C.

3. A method of making a substantially colorless, transparent solid copolymer of approximately equimolecular amounts of butadiene-1,3 and a trialkyl aconitate which comprises reacting butadiene-1,3 with a trialkyl aconitate at a reaction temperature below 80° C.

4. A method of making a substantially colorless, transparent rubbery copolymer of approximately equimolecular amounts of butadiene-1,3 and tributyl aconitate which comprises reacting butadiene-1,3 with a tributyl aconitate at a reaction temperature below 80° C.

5. A copolymer of one molecular equivalent of an aliphatic conjugated diolefine and from 0.9 to 1.1 molecular equivalent of a saturated monohydric alcohol triester of aconitic acid.

6. A copolymer of one molecular equivalent of an aliphatic conjugated diolefine having from 4 to 6 carbon atoms in the molecule and from 0.9 to 1.1 molecular equivalent of a saturated monohydric alcohol triester of aconitic acid.

7. A liquid copolymer of one molecular equivalent of an aliphatic conjugated diolefine having from 4 to 6 carbon atoms in the molecule and from 0.9 to 1.1 molecular equivalent of a trialkyl aconitate.

8. A solid rubbery copolymer of one molecular equivalent of an aliphatic conjugated diolefine having from 4 to 6 carbon atoms in the molecule and from 0.9 to 1.1 molecular equivalent of a trialkyl aconitate containing from 10 to 24 carbon atoms in the molecule.

9. A copolymer of one molecular equivalent of butadiene-1,3 and from 0.9 to 1.1 molecular equivalent of a saturated monohydric alcohol triester of aconitic acid.

10. A liquid copolymer of one molecular equivalent of butadiene-1,3 and from 0.9 to 1.1 molecular equivalent of a trialkyl aconitate.

11. A solid rubbery copolymer of one molecular equivalent of butadiene-1,3 and from 0.9 to 1.1 molecular equivalent of a trialkyl aconitate having from 10 to 24 carbon atoms in the molecule.

12. A copolymer of one molecular equivalent of butadiene-1,3 and from 0.9 to 1.1 molecular equivalent of a trialkyl aconitate having from 1 to 6 carbon atoms in each of the alkyl radicals thereof.

13. A copolymer of one molecular equivalent of butadiene-1,3 and from 0.9 to 1.1 molecular equivalent of trimethyl aconitate.

14. A solid copolymer of one molecular equivalent of butadiene-1,3 and from 0.9 to 1.1 molecular equivalent of trimethyl aconitate.

15. A copolymer of one molecular equivalent of butadiene-1,3 and from 0.9 to 1.1 molecular equivalent of tributyl aconitate.

16. A solid rubbery copolymer of one molecular equivalent of butadiene-1,3 and from 0.9 to 1.1 molecular equivalent of tri-(n-butyl) aconitate.

17. The product resulting from vulcanization of a copolymer defined in claim 5.

18. A rubbery product resulting from vulcanization of the copolymer defined by claim 15.

19. A copolymer of one molecular equivalent of butadiene-1,3 and from 0.9 to 1.1 molecular equivalent of triisobutyl aconitate.

20. A copolymer of one molecular equivalent of butadiene-1,3 and from 0.9 to 1.1 molecular equivalent of tricyclohexyl aconitate.

RAYMOND F. BOYER.
LOUIS C. RUBENS.

REFERENCES CITED

The following references are of record in the file of this patent:

UNITED STATES PATENTS

| Number | Name | Date |
|---|---|---|
| 2,200,429 | Perrin et al. | May 14, 1940 |
| 2,221,663 | Rothrock | Nov. 12, 1940 |
| 2,226,794 | Pannwitz et al. | Dec. 23, 1941 |
| 2,419,122 | Cox | Apr. 15, 1947 |